United States Patent
Kiriake

(10) Patent No.: US 7,155,631 B2
(45) Date of Patent: Dec. 26, 2006

(54) INFORMATION PROCESSING UNIT WITH A CLOCK CONTROL CIRCUIT HAVING ACCESS TO THE SYSTEM BUS DURING SYSTEM CLOCK CHANGES

(75) Inventor: Wataru Kiriake, Kanagawa (JP)

(73) Assignee: NEC Electronics Corporation, Kanagawa (JP)

( * ) Notice: Subject to any disclaimer, the term of this patent is extended or adjusted under 35 U.S.C. 154(b) by 465 days.

(21) Appl. No.: 10/367,758

(22) Filed: Feb. 19, 2003

(65) Prior Publication Data

US 2003/0159080 A1    Aug. 21, 2003

(30) Foreign Application Priority Data

Feb. 19, 2002    (JP)    ............... 2002-040869

(51) Int. Cl.
G06F 1/04    (2006.01)
G06F 1/10    (2006.01)
(52) U.S. Cl. .................. 713/600; 713/500; 713/502
(58) Field of Classification Search ............ None
See application file for complete search history.

(56) References Cited

U.S. PATENT DOCUMENTS 5,600,839 A * 2/1997 MacDonald ............... 713/322
6,163,848 A * 12/2000 Gephardt et al. ........... 713/322
6,496,938 B1 * 12/2002 Fry et al. .................... 713/322
6,496,940 B1 * 12/2002 Horst et al. .................... 714/4
6,625,743 B1 * 9/2003 Gulick ........................ 713/400
6,643,792 B1 * 11/2003 Kurosawa ................... 713/501

FOREIGN PATENT DOCUMENTS

| DE | 197 06 496 A1 | 2/1997 |
| JP | 07-152449 | 6/1995 |
| JP | 2000-020462 | 1/2000 |
| JP | 2000-276436 | 10/2000 |
| JP | 2001-051747 | 2/2001 |
| JP | 2002-007316 | 1/2002 |

OTHER PUBLICATIONS

Japanese Office Action dated Dec. 1, 2004 with a partial English translation.
European Search Report dated Jan. 9, 2006.

* cited by examiner

*Primary Examiner*—James K. Trujillo
*Assistant Examiner*—Anand B. Patel
(74) *Attorney, Agent, or Firm*—McGinn IP Law Group, PLLC

(57) ABSTRACT

An information processing unit has a system bus that connects devices configuring the information processing unit. An arbiter performs arbitration related to use of this system bus, and a clock control circuit controls the clock to be supplied to the devices. The clock control circuit can make a bus request to the arbiter and executes a clock switch or clock halt after being granted use of the bus by the arbiter.

8 Claims, 6 Drawing Sheets

INFORMATION PROCESSING UNIT WITH A CLOCK CONTROL CIRCUIT HAVING ACCESS TO THE SYSTEM BUS DURING SYSTEM CLOCK CHANGES

BACKGROUND OF THE INVENTION

1. Field of the Invention

The present invention relates to an information processing unit. In particular, it relates to an information processing unit, which performs clock switching dynamically.

2. Description of the Prior Art

Typically, reduction of power consumption has been a common problem for information processing units including a central processing unit (CPU). In particular, there is an urgent need to reduce power consumption since batteries are used as power supply for portable information processing units, such as those in mobile phones or mobile terminals. Therefore, in order to reduce power consumption, for example, the clock for an inactive circuit section is halted, or the clock for a circuit section in which high-speed operation is not required is switched to low speed.

In order to achieve such processing, a system typically includes a power management unit. This power management unit performs detection or prediction of an inactive circuit section, and issues an instruction to halt the clock signal related to that inactive circuit section in accordance with that detection or prediction. It is also necessary to issue an instruction to switch to low speed the clock that drives a circuit section that is in operation mode and where processing time is unimportant.

If data transfer (hereafter also referred to as "direct memory access" or "DMA") between memory and peripheral equipment is performed on the bus without using the CPU when performing a clock switch or clock halt, the data transfer may fail. For example, when a memory read cycle of DMA is being executed by burst transfer in which data is consecutively output while incrementing a memory address for each clock cycle, if a clock edge cannot be received within a prescribed period because of a clock being halted or de-accelerated, the bus master may lose the data that immediately follows the clock switch. Accordingly, it is necessary to perform a clock switch or clock halt at a time where DMA is not being performed on the bus.

A means for solving such problems is disclosed in Japanese Patent Application Laid-open No. Hei 7-152499. In this document, an information processing unit in which a clock control circuit monitors a bus request signal from a peripheral processor, or a master monitors a signal for requesting use of a bus is proposed.

FIG. 2 illustrates a configuration of an information processing unit according to this Japanese Patent Application Laid-open No. Hei 7-152499. In Japanese Patent Application Laid-open No. Hei 7-152499, as shown in FIG. 2, presence of a bus request signal from a master 1 (10) and master 2 (11), which are peripheral processors, is conveyed to a power management unit 4 as a clock request. The power management unit 4 then applies control so as to halt or de-accelerate the clock in order to achieve power saving when there is no bus request signal.

Nevertheless, with the information processing unit disclosed in Japanese Patent Application Laid-open No. Hei 7-152499, a clock switch cannot be performed when a bus request signal is consecutively asserted by a plurality of master devices. Accordingly, the clock cannot be switched to low speed and it must continue to operate with a high-speed clock and consume excess power. In the opposite case, when high-speed operation is requested while operating with a low-speed clock, the clock naturally cannot be switched to a high-speed clock if the bus request signal is being consecutively asserted.

In addition, other problems exist where even in the case where the bus request signal is de-asserted (disabled), there is a case where once becoming a bus master, data transfer is continued by de-asserting the bus request signal, such as during burst transfer. Therefore, it is not possible to determine whether or not data transfer is performed from only the presence of a bus request signal. Moreover, a device that becomes the bus master must continue to assert (enable) the bus request signal until the data transfer ends. Therefore, an arbiter cannot determine whether this bus request signal is for the current transfer or for a new transfer, making high-speed arbitration impossible. In other words, with the information processing unit disclosed in the Japanese Patent Application Laid-open No. Hei 7-152499, the compatibility of the information processing unit becomes limited.

BRIEF SUMMARY OF THE INVENTION

Summary of the Invention

An information processing unit has a system bus that connects devices configuring the information processing unit; an arbiter that performs arbitration relating to use of this system bus; and a clock control circuit that controls the clock to be supplied to the devices, wherein the clock control circuit has a means for performing a bus request signal to the arbiter; and a means for performing a clock switch or clock halt after being granted use of a bus by the arbiter.

BRIEF DESCRIPTION OF THE DRAWINGS

The above-mentioned and other objects, features and advantages of this invention will become more apparent by reference to the following detailed description of the invention taken in conjunction with the accompanying drawings, wherein.

DETAILED DESCRIPTION OF THE INVENTION

Embodiments of the present invention are described forthwith in more detail while referencing the appended drawings.

Figure 1:
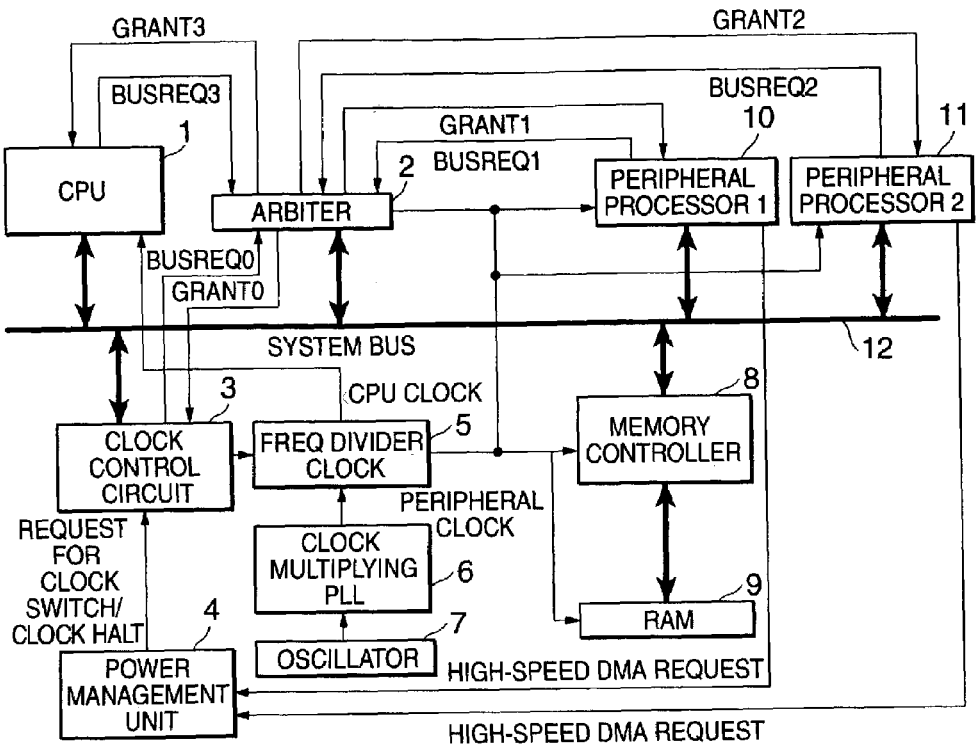
FIG. 1 is a block diagram illustrating a configuration of an information processing unit as an embodiment of the present invention.
Figure 2:
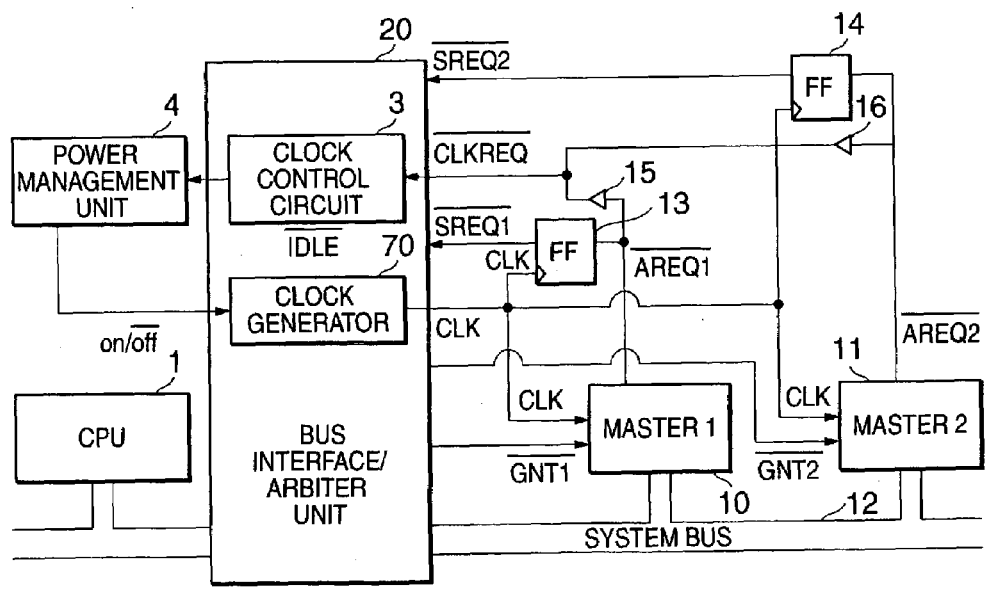
FIG. 2 is a block diagram illustrating a configuration of an information processing unit according to Japanese Patent Application Laid-open No. Hei 7-152499.

FIG. 1 illustrates a configuration of an information processing unit according to the first embodiment of the present invention.

In FIG. 1, the information processing unit includes a CPU 1, arbiter 2, clock control circuit 3, power management unit 4, frequency divider circuit 5, clock multiplying phase locked loop (PLL) circuit 6; oscillator 7, memory controller 8, random access memory (RAM) 9, peripheral processor 1 (10), peripheral processor 2 (11), and system bus 12. Of these, the CPU 1, arbiter 2, clock control circuit 3, memory controller 8, peripheral processor 1 (10), and peripheral processor 2 (11) are interconnected via the system bus 12. More specifically, in addition to having the CPU 1 connected to a local bus, and the peripheral processor 1 (10) and peripheral processor 2 (11) connected to a peripheral bus, the information processing unit has a bus interface that adjusts data/address signal transfer between the local bus and peripheral bus.

The CPU 1 is a data processing unit that implements a predefined instruction set. The arbiter 2 selects the device that has the highest priority and issues a grant signal in response to a bus request signal from a peripheral processor or the like. The clock control circuit 3 is a circuit that controls clock switches and clock halts. In particular, in this example the clock control circuit 3 has a trigger register to perform the clock switch or clock halt. In the case where data is written into this trigger register, clock switch or clock halt processing is performed.

The power management unit 4 performs power management by outputting a request for a clock switch or clock halt to the clock control circuit 3. The oscillator 7 outputs a predetermined clock signal. The clock multiplying PLL circuit 6 multiplies the clock signal output from the oscillator 7. The frequency divider circuit 5 is a circuit which either frequency divides the clock output from the clock multiplying PLL circuit 6 and converts it into a clock signal having a predetermined number of clock cycles or outputs it without changing it, and then supplies either the original clock or the resultant clock signal to the CPU 1 or peripheral processor 10 or 11. The frequency division ratio for the frequency divider circuit 5 is controlled by the clock control circuit 3. The memory controller 8 controls access between the CPU 1 and peripheral processors 10 and 11, and RAM 9.

The peripheral processors 10 and 11 have an internal DMA control circuit, and make high-speed DMA requests to the power management unit 4 when it is required that high-speed DMA be performed by the peripheral processors 10 and 11 themselves. The power management unit 4 issues to the clock control circuit 3 an instruction for switching the clock to low speed in order to reduce power consumption if there is no high-speed DMA request from the peripheral processor 10 or 11.

Point-to-point connection is made between the CPU 1 and arbiter 2, and between the arbiter 2 and peripheral processors 10 and 11.

Here, processing in the case where the CPU 1 or peripheral processor 10 or 11 uses the system bus 12 is described. In such a case, processing is implemented by exchanging a bus request signal (BUSREQ) and a bus grant signal (GRANT) between the CPU 1 and arbiter 2, or between the arbiter 2 and peripheral processors 10 and 11. To begin with, the CPU 1 or peripheral processor 10 or 11 asserts or enables the bus request signal (BUSREQ) to use the system bus 12. The arbiter 2 arbitrates the bus request made through the bus request signal (BUSREQ). The arbiter 2 then asserts the bus grant signal (GRANT) to the CPU 1 or peripheral processor 10 or 11 that is recognized as the bus master as a result of arbitration.

The CPU 1 or peripheral processor 10 or 11 to which the bus grant signal has been asserted becomes the bus master and initiates a bus transaction.

In particular, in the information processing unit according to the embodiments of the present invention, a point-to-point connection is made between the clock control circuit 3 and arbiter 2. Exchange of the bus request signal (BUSREQ) and bus grant signal (GRANT) is performed between the clock control circuit 3 and arbiter 2. Accordingly, the clock control circuit 3 is also able to become a bus master as well as the CPU 1 and peripheral processors 10 and 11. Further, the arbitration priority ranking of the clock control circuit 3 is higher than that of the CPU 1 or peripheral processor 10 or 11, that is, the highest priority is assigned to the clock control circuit 3 in the arbiter 2.

Figure 3:
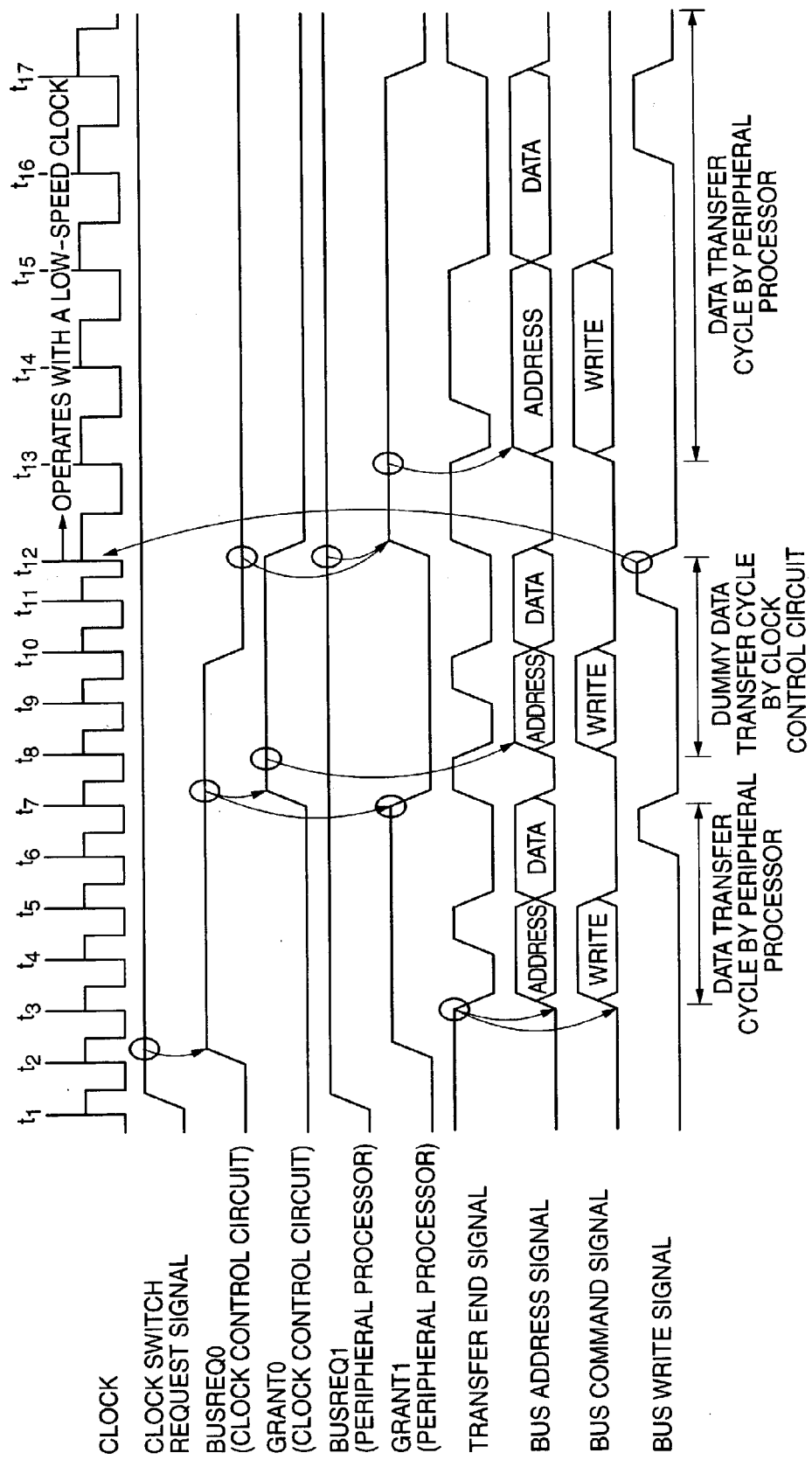
FIG. 3 is a timing chart illustrating a bus control method according to a first embodiment of the present invention.
Figure 4:
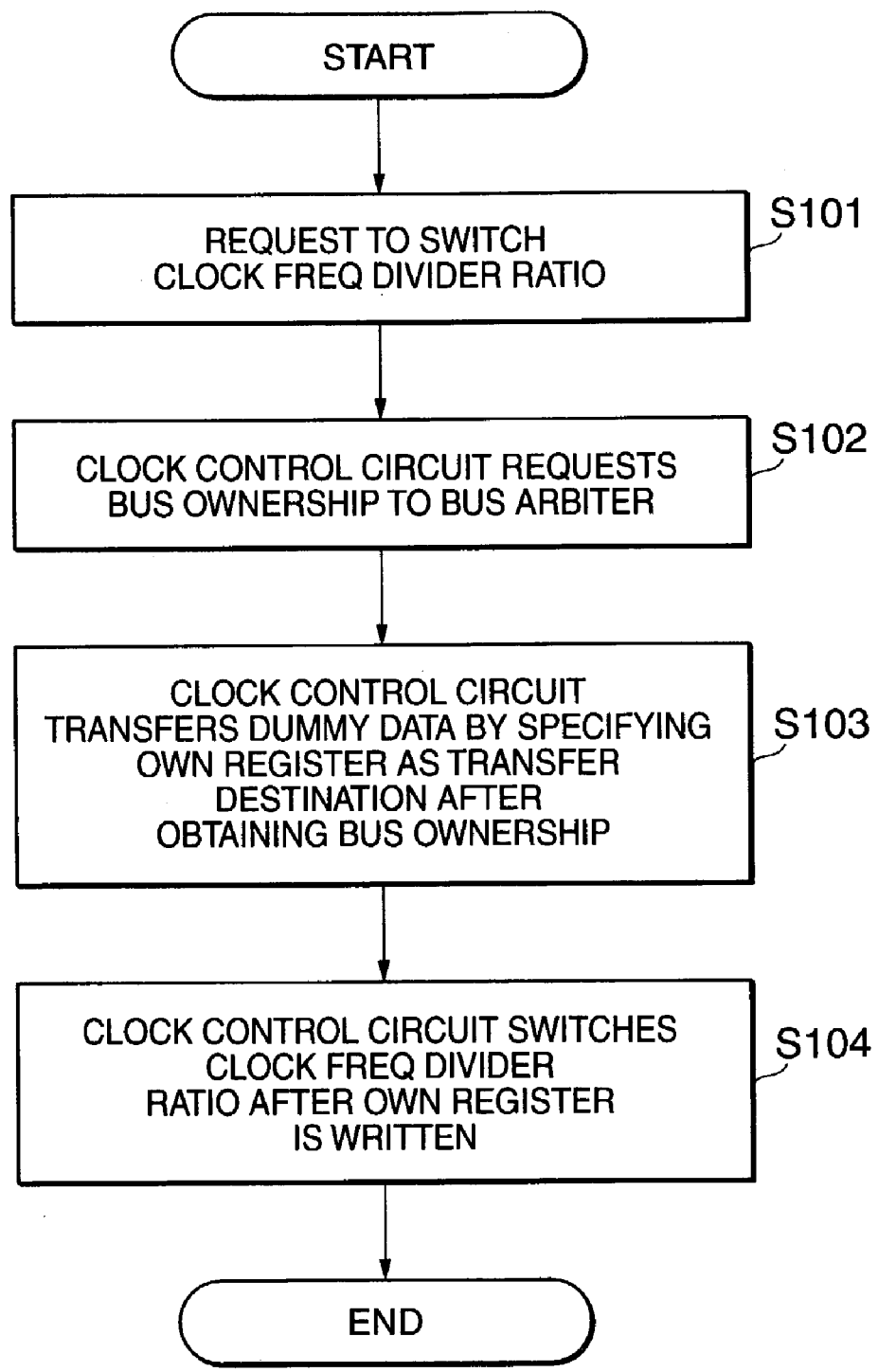
FIG. 4 is a flowchart illustrating a bus control method according to the first embodiment of the present invention.

Next, the processing operation of an information processing unit according to this first embodiment is described while referencing the drawings. FIG. 3 is a timing chart of the information processing unit according to this first embodiment. FIG. 4 is a flowchart illustrating the operation of a clock control circuit during a clock switch in the information processing unit according to the first embodiment.

As shown in the timing chart of FIG. 3, the power management unit 4 performs a clock switch to a low-speed clock if there is no high-speed DMA request in order to save power. In this example, the power management unit 4 is making the request for a switch to a low-speed clock to the clock control circuit 3 by asserting the clock switch request signal at time point t1.

The clock control circuit 3 asserts a bus request signal (BUSREQ0) in order to obtain bus ownership after receiving the request for a switch to a low-speed clock. A bus ownership request is made to the arbiter 2 at time point t2 through this bus request signal (BUSREQ0).

Meanwhile, a bus request signal (BUSREQ1) from the peripheral processor 1 (10) to the arbiter 2 is asserted at time point t1. The arbiter 2 asserts a bus grant signal (GRANT1) at time point t2 in response to this bus request signal (BUSREQ1). Since the arbiter 2 has asserted the bus grant signal (GRANT1) to the peripheral processor 1 (10) when the arbiter 2 recognizes the assertion of the bus request signal from the clock control circuit 3 at time point t2, the clock control circuit 3 is not granted use of the system bus 12 immediately. Accordingly, data transfer, which is a type of bus transaction, is performed in the meantime on the system bus 12 by the peripheral processor 1 (10) between time points t3 and t7.

At time point t7 where the first bus transaction by the peripheral processor 1 (10) ends, the peripheral processor 1 (10) is still continuing to assert the bus request signal (BUSREQ1). Nevertheless, the arbiter 2 de-asserts the bus grant signal (GRANT1) to the peripheral processor 1 (10) and asserts a bus grant signal (GRANT0) to the clock control circuit 3 at time point t7 since the highest priority in the arbitration priority ranking is assigned to the clock control circuit 3.

The clock control circuit 3 becomes the bus master after the bus grant signal (GRANT0) is asserted. The clock control circuit 3, which is now the bus master, then starts a bus transaction at time point t8. To begin with, in the address phase, the address of the clock switch trigger register in the clock control circuit 3 is output to the system bus 12 as a transfer destination address. Next, in the data phase, the clock control circuit 3 outputs dummy data. Furthermore, the clock control circuit 3 de-asserts the bus request signal (BUSREQ0) at time point t12 after this data phase ends in order to release ownership of the system bus 12.

The clock control circuit 3 switches the clock by changing the frequency divider ratio for the frequency divider circuit when the clock switch trigger register in the clock control circuit 3 is written into through this bus transaction. In this example, the clock is switched to low speed at time point t12.

Upon completion of the clock switch, or following time point t12, the arbiter 2 asserts the bus grant signal (GRANT1) in response to the bus request signal (BUS-REQ1) being asserted by the peripheral processor 1 (10). The peripheral processor 1 (10) to which the bus grant signal (GRANT1) is asserted performs the bus transaction with a low-speed clock.

Here, the processing flow of the information processing unit according to the first embodiment of the present invention is described again by using the flowchart shown in FIG. 4. To begin with, it is assumed that there is a request for a clock frequency division ratio switch, or a clock switch request from the power management unit 4 (S101). The clock control circuit 3 makes a request for bus ownership to the arbiter 2 in response to the clock switch request (S102). After obtaining bus ownership, the clock control circuit 3 performs dummy data transfer by specifying an internal register of the clock control circuit 3 as the transfer destination address (S103). If its own register specified as the transfer destination is written, the clock control circuit 3 makes this the trigger signal and switches the clock frequency division ratio (S104).

In this manner, by making the writing into the register the trigger for switching the clock, even in the case where the immediately preceding transfer is a consecutive transfer such as a burst transfer, it becomes possible for a clock switch or clock halt to be executed in the status where there is no master using the system bus 12 following completion of the immediately preceding transfer. In addition, since the arbitration priority ranking for the clock control circuit 3 has been assigned the highest priority of arbitration, even if there are competing bus requests from the CPU or peripheral processors, the clock control circuit 3 becomes the bus master because of priority and becomes able to switch the clock.

A second embodiment of the present invention relates to an information processing unit in the case of halting a clock. The fundamental configuration of this information processing unit is same as that of the first embodiment of the present invention. Even in the case where the information processing unit according to the second embodiment of the present invention halts the clock, since data transfer may fail if the clock is halted when data transfer is performed on the system bus, it is necessary for the information processing unit to become the bus master when halting the clock.

Figure 5:
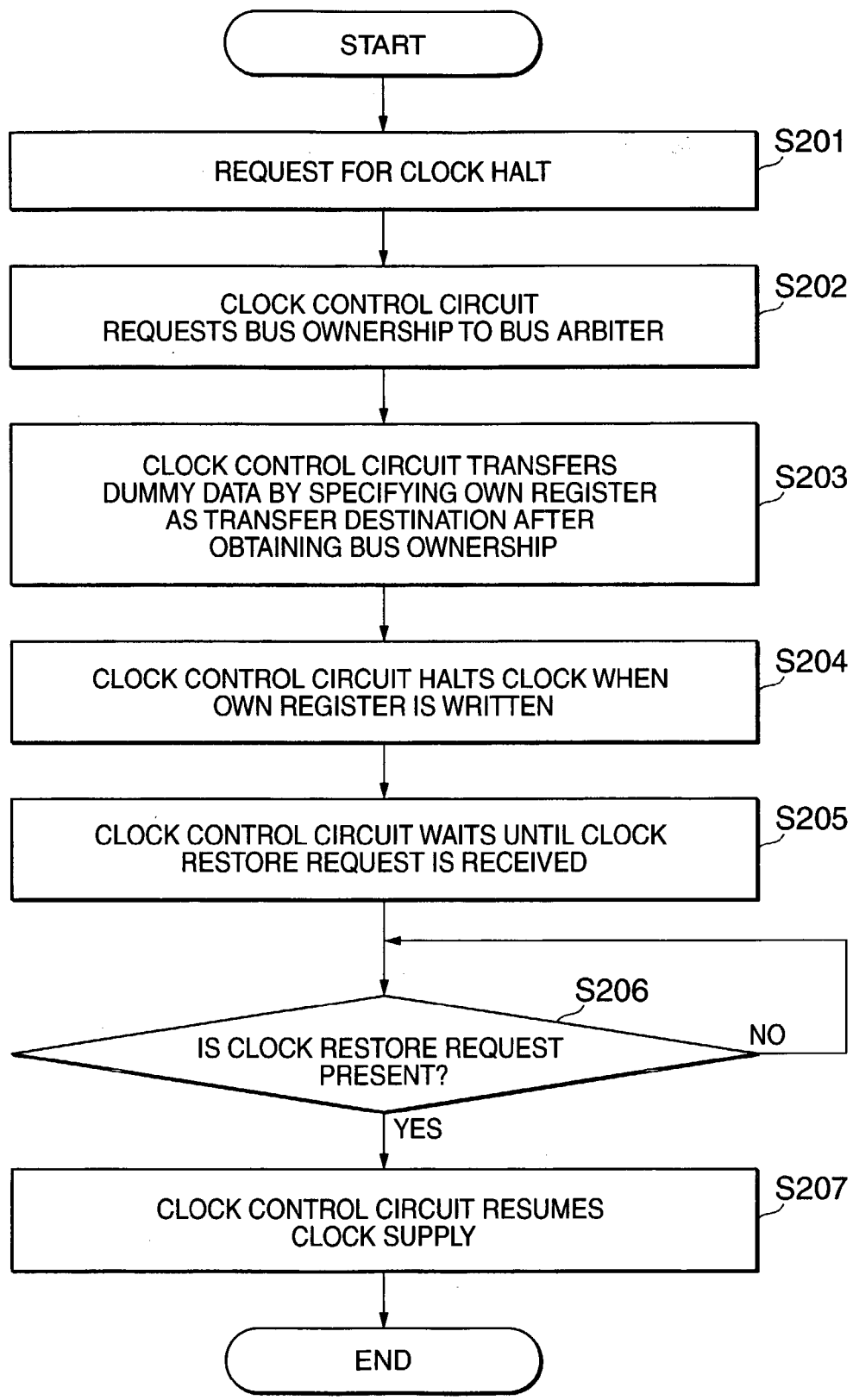
FIG. 5 is a flowchart illustrating a bus control method according to a second embodiment of the present invention.

FIG. 5 illustrates a flowchart in the case of halting the clock in the information processing unit according to the second embodiment of the present invention.

In the flowchart shown in FIG. 5, the flow from halting the clock to becoming the bus master is same as the processing flow of the information processing unit according to the first embodiment of the present invention. Namely, to begin with, it is assumed that there is a clock halt request from the power management unit 4 to the clock control circuit 3 (S201).

Upon receiving the clock halt request, the clock control circuit 3 asserts a bus request signal (BUSREQ0) in order to obtain bus ownership (S202). A request for bus ownership is made to the arbiter 2 through this bus request signal (BUS-REQ0) The arbiter 2 asserts a bus grant signal (GRANT0) to the clock control circuit 3 since the highest priority in the arbitration priority ranking is assigned to the clock control circuit 3.

The clock control circuit 3 becomes the bus master after the bus grant signal (GRANT0) is asserted. The clock control circuit 3, which is now the bus master, then starts a bus transaction. To begin with, in the address phase, the address of the clock halt trigger register in the clock control circuit 3 is output to the system bus 12 as the transfer destination address. Next, in the data phase, the clock control circuit 3 outputs dummy data (S203).

The clock control circuit 3 halts the clock when the clock halt trigger register in the clock control circuit 3 is written into through this bus transaction (S204).

The clock control circuit 3 stays in the wait state until an instruction to return to normal operation, or a clock restore request is received (S205). If there is an instruction to return to normal operation following the clock halt (S206), the clock control circuit 3 resumes clock supply (S207). It should be noted that because there is no suspended data transfer when the clock is halted since the clock control circuit 3 becomes the bus master and halts the clock, it is not necessary for it to become the bus master when resuming clock supply.

A third embodiment of the present invention relates to an information processing unit that has an oscillator clock supplied to the system bus and peripheral processors that merely passes through the PLL during the PLL lock-up period. The fundamental configuration of this information processing unit is same as that of the first embodiment of the present invention.

In the information processing unit according to the third embodiment of the present invention, in normal operation, a clock generated by multiplying the clock of the oscillator 7 with the clock multiplying PLL 6 is supplied to the CPU 1 and peripheral processors 10 and 11. As with the information processing unit shown in the second embodiment of the present invention, in the case of halting clock supply to the CPU 1 and the peripheral processors 10 and 11, the clock multiplying PLL 6 is turned off (OFF) in order to reduce the clock multiplying PLL 6 power consumption. In this case, upon resuming clock supply, it is not possible to supply a clock multiplied by the clock multiplying PLL 6 to the CPU 1 and peripheral processors 10 and 11 until the phase is synchronized after turning the clock multiplying PLL 6 on (ON), or in other words, during the lock-up period.

Accordingly, in the information processing unit according to the third embodiment of the present invention, to resume information processing immediately, for the lock-up period of the clock multiplying PLL 6, the clock of the oscillator 7 is supplied to the system bus 12 and peripheral processors 10 and 11 merely passes through the PLL. After the lock-up period, the clock multiplied by the clock multiplying PLL 6 is switched to be clock output to the CPU 1 and peripheral processors 10 and 11.

Figure 6:
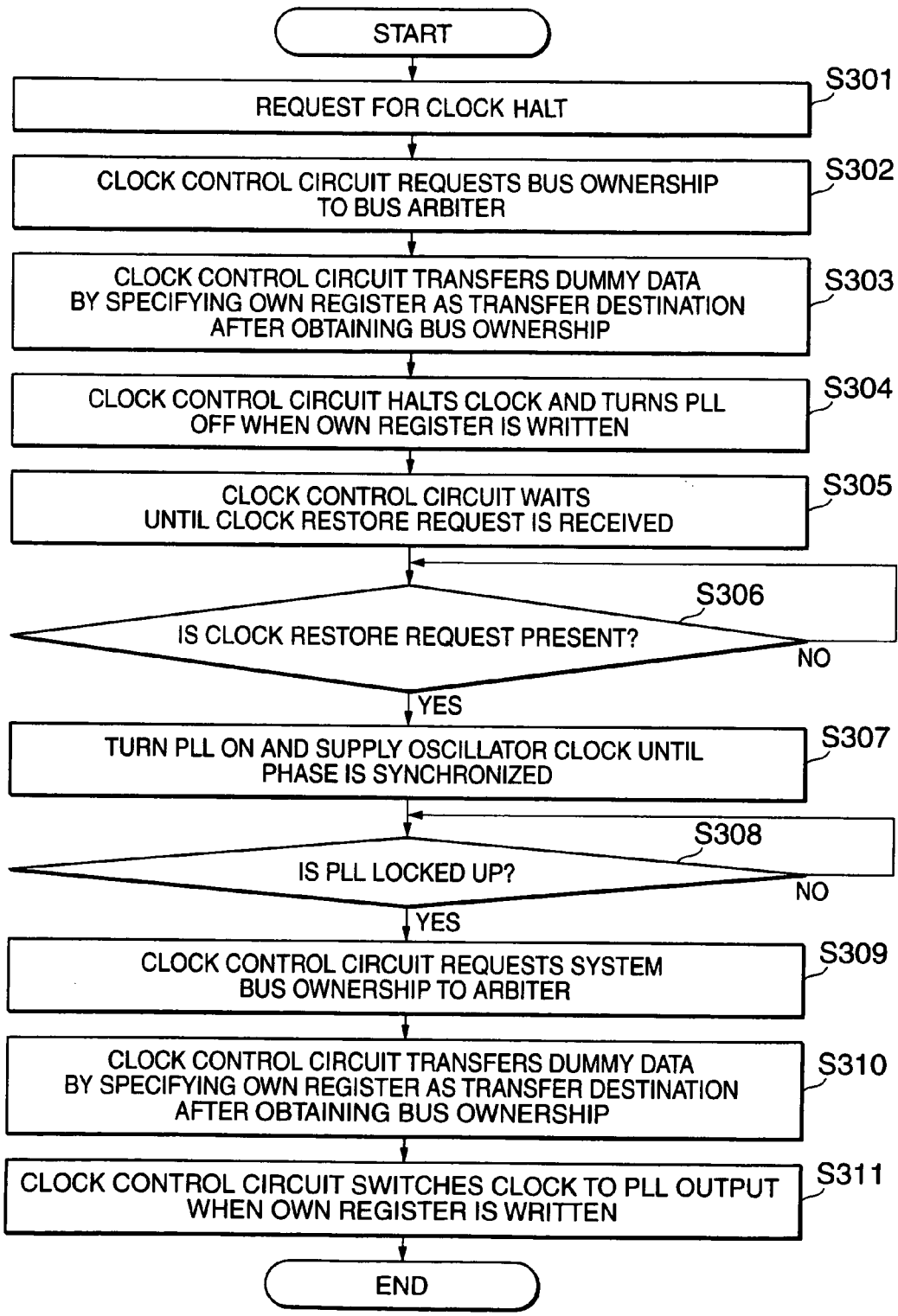
FIG. 6 is a flowchart illustrating a bus control method according to a third embodiment of the present invention.

FIG. 6 is a flowchart illustrating the processing operation of an information processing unit according to a third embodiment of the invention.

In the flowchart shown in FIG. 6, the flow from when the clock is halted to when it becomes the bus master is same as the processing flow for the information processing unit according to the first embodiment of the present invention. Namely, to begin with, it is assumed that there is a clock halt request from the power management unit 4 to the clock control circuit 3 (S301).

Upon receiving the clock halt request, the clock control circuit 3 asserts a bus request signal (BUSREQ0) in order to obtain bus ownership (S302). Bus ownership is requested to the arbiter 2 by this bus request signal (BUSREQ0). The arbiter 2 asserts a bus grant signal (GRANT0) to the clock control circuit 3 since the highest priority in the arbitration priority ranking is assigned to the clock control circuit 3.

The clock control circuit 3 becomes the bus master after the bus grant signal (GRANT0) is asserted. The clock control circuit 3, which is now the bus master, then starts a bus transaction. To begin with, in the address phase, the address of the clock halt trigger register in the clock control circuit 3 is output to the system bus 12 as a transfer destination address. Next, in the data phase, the clock control circuit 3 outputs dummy data (S303).

If writing into the clock halt trigger register in the clock control circuit 3 happens through this bus transaction, the clock control circuit 3 halts the clock and turns the clock multiplying PLL 6 off (S304).

The clock control circuit 3 stays in the wait state until an instruction to return to normal operation, or a clock restore request is received (S305). If there is an instruction to return to normal operation after halting the clock (S306), the clock control circuit 3 turns the clock multiplying PLL 6 on, and until the PLL enters locked state or the phase is synchronized, the clock from the oscillator 7 merely passes through the PLL and is supplied to the CPU 1 and peripheral processors 10 and 11 (S307).

Thereafter, in the case where the clock multiplying PLL 6 is locked up, and the phase is synchronized (S308), the clock control circuit 3 makes a request for bus ownership of the system bus 12 to the arbiter 2 (S309). Namely, the clock control circuit 3 asserts the bus request signal (BUSREQ0) to the arbiter 2.

The arbiter 2 asserts the bus grant signal (GRANT0) to the clock control circuit 3.

The clock control circuit 3 becomes the bus master after the bus grant signal (GRANT0) is asserted. The clock control circuit 3, which is now the bus master, then starts a bus transaction. To begin with, in the address phase, the address of the clock halt trigger register in the clock control circuit 3 is output to the system bus 12 as the transfer destination address. In the data phase, the clock control circuit 3 outputs dummy data (S310).

The clock control circuit 3 switches from a clock supplied to the CPU 1 and peripheral processors 10 and 11 from the direct output of the clock of the oscillator 7, to the clock output that has been multiplied by the clock multiplying PLL 6 when the clock halt trigger register in the clock control circuit 3 is written through this bus transaction (S311).

Performing such control allows the clock to be switched immediately without having the system be aborted or a failure in data transfer.

A fourth embodiment of the present invention relates to an information processing unit that performs writing in the clock switch or clock halt trigger register from a device other than the clock control circuit, such as the CPU or peripheral processor. The fundamental configuration of this information processing unit is same as that of the first embodiment of the present invention.

In the above-mentioned first through third embodiments of the present invention, in the case where the clock control circuit receives a request for a clock switch or clock halt, it was the clock control circuit itself that was performing the dummy data transfer to write into the clock switch trigger register. Nevertheless, when writing into the clock switch trigger register, the contents of the dummy data output to the system bus have no meaning. Since there is no problem if this data is lost due to a clock switch, it is not necessary to limit the bus master that writes into the clock switch trigger register to only the clock control circuit.

Namely, in the case where there develops a need to switch the clock in the CPU or peripheral processor, the CPU or peripheral processor itself may become the bus master to directly write into the clock switch trigger register in the clock control circuit without generating a clock switch request signal. In this case, the clock control circuit switches the clock timed with when the trigger register is written. Since it may be determined that no data transfer is being performed on the system bus when the clock switch trigger register is written, it is possible to switch the clock at a time where data transfer is not performed on the system bus.

In this case, when the arbitration priority of the peripheral processor is low, the peripheral processor is kept waiting until it becomes the bus master. Accordingly, by assigning an arbitration priority ranking to the peripheral processor having the trigger register writing function that is higher than that of the peripheral processor that has no need for writing into the trigger register, the former becomes the bus master immediately and can switch the clock by writing into the clock switch trigger register.

Figure 7:
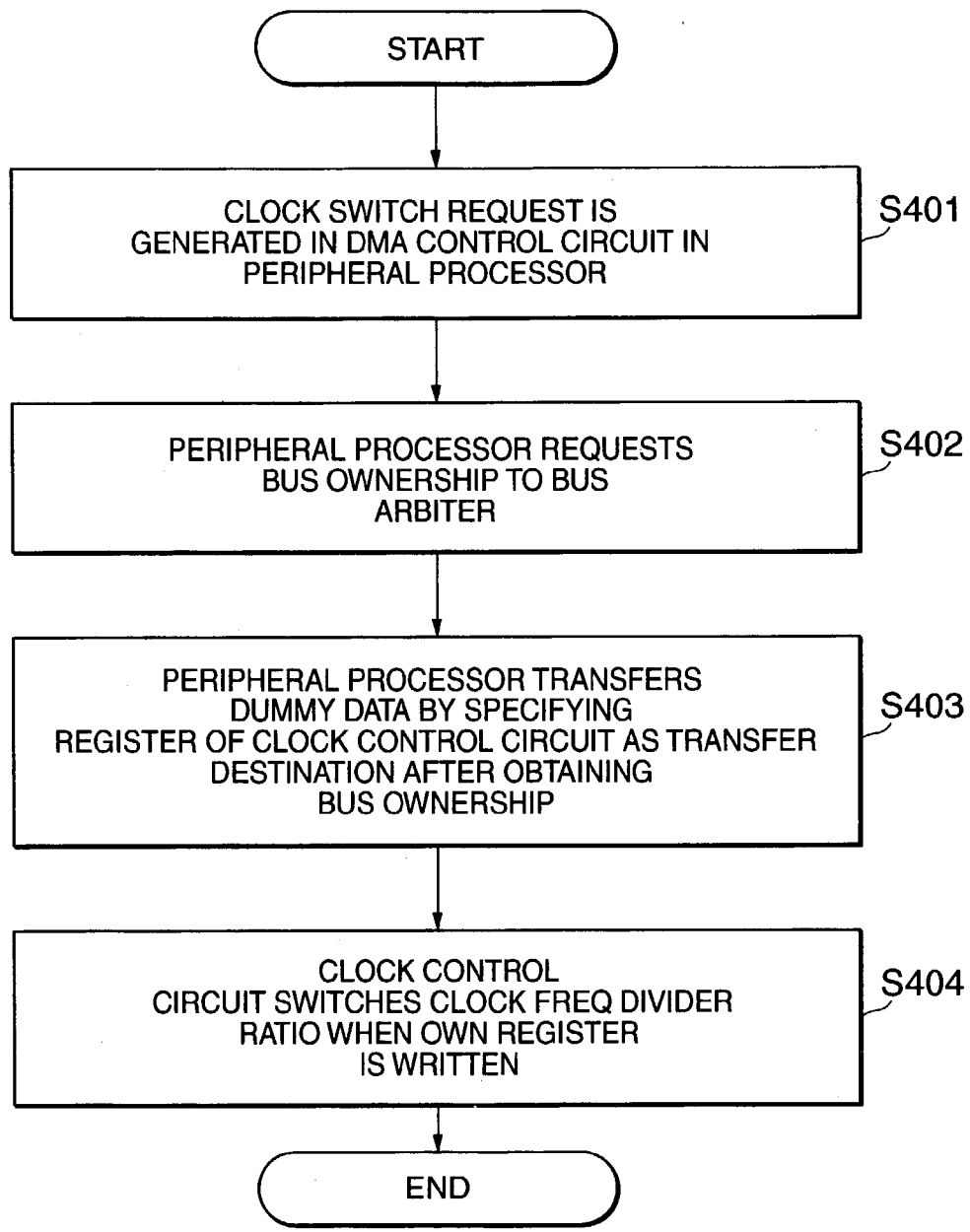
FIG. 7 is a flowchart illustrating a bus control method according to a fourth embodiment of the present invention.

FIG. 7 is a flowchart illustrating the processing operation of an information processing unit according to a fourth embodiment of the present invention.

To begin with, it is assumed that a clock switch request is generated in a DMA control circuit embedded in the peripheral processor 10 (S401).

The peripheral processor 10 asserts a bus request signal (BUSREQ0) in order to obtain bus ownership. A request for bus ownership is made to the arbiter 2 by this bus request signal (BUSREQ0) (S402).

The arbiter 2 asserts a bus grant signal (GRANT0) to the peripheral processor 10. The peripheral processor 10 becomes the bus master after the bus grant signal (GRANT0) is asserted. The peripheral processor 10, which is now the bus master, then starts a bus transaction. To begin with, in the address phase, the peripheral processor 10 outputs the address of the clock switch trigger register in the clock control circuit 3 to the system bus 12 as the transfer destination address. Next, in a data phase, the peripheral processor 10 outputs dummy data (S403).

The clock control circuit 3 switches the clock frequency division ratio when the clock switch trigger register in the clock control circuit 3 is written through this bus transaction (S404). In this manner, it is possible to perform a clock switch.

It should be noted that in this fourth embodiment of the invention, the case of performing clock switch is described, however, it is not limited to this and may also be applied in the case of halting the clock.

Performing such control allows a clock to be switched immediately without having the system be aborted or a failure in data transfer.

It is apparent that the present invention is not limited to the above-mentioned embodiments, and each embodiment may be modified as desired within the range of the technical idea of the present invention.

As described above, according to the present invention, it is possible to provide a bus control method and information processing unit that is capable of performing a clock switch or clock halt immediately and avoiding the danger that a clock switch or clock halt might occur during data transfer.

Although the invention has been described with reference to specific embodiments, this description is not meant to be construed in a limiting sense. Various modifications of the disclosed embodiments will become apparent to persons skilled in the art upon reference to the description of the invention. It is therefore contemplated that the appended claims will cover any modifications or embodiments as fall within the true scope of the invention.

What is claimed is:

1. An information processing unit, comprising:
a plurality of devices each operating in response to a clock signal supplied thereto;
a clock generator supplying each of the devices with the clock signal;
a system bus interconnecting the devices to each other;
an arbiter performing arbitration related to a use of the system bus by any of the devices; and
a clock control circuit coupled to the system bus and the arbiter and receiving a clock switch or halt request that requests a clock generator to perform a clock switch or halt request and causing, after the use of the system bus has been granted thereto, the clock generator to perform the clock switch or halt operation, wherein
said clock control circuit transfers dummy data via said system bus after the use of the system bus has been granted thereto.

2. The information processing unit according to claim 1, wherein said clock control circuit includes a register therein and transfers said dummy data to said register thereof.

3. The information processing unit according to claim 2, wherein
said dummy data is written in said register in response to a bus write signal; and
said clock control circuit performs said clock switch or halt operation in synchronization with said bus write signal.

4. An information processing unit, comprising:
a plurality of devices each operating in response to a clock signal supplied thereto;
a clock generator supplying each of the devices with the clock signal;
a system bus interconnecting the devices to each other;
an arbiter performing arbitration related to a use of the system bus by any of the devices; and
a clock control circuit coupled to the system bus and the arbiter and receiving a clock switch or halt request that requests a clock generator to perform a clock switch or halt request and causing, after the use of the system bus has been granted thereto, the clock generator to perform the clock switch or halt operation,
wherein said clock generator comprises:
an oscillator outputting a first clock; and
a clock generating circuit receiving said first clock and generating a second clock, said clock generating circuit adjusting phases of said first clock and said second clock,
wherein said first clock is used until said clock generating circuit completes adjusting phases of said first clock and second clock, and said second clock is used after said clock generating circuit completes adjusting phases of said first clock and said second clock.

5. An information processing unit, comprising:
an oscillator outputting a first clock; and
a clock generating circuit receiving said first clock and generating a second clock, said clock generating circuit adjusting phases of said first clock and said second clock,
wherein said first clock is used until said clock generating circuit completes adjusting phases of said first clock and second clock, and said second clock is used after said clock generating circuit completes adjusting phases of said first clock and said second clock.

6. The information processing unit according to claim 5, wherein, in a case of restarting a halted clock, said first clock is used until said clock generating circuit completes adjusting phases of said first clock and second clock, and said second clock is used after said clock generating circuit completes adjusting phases of said first clock and said second clock.

7. The information processing unit according to claim 5, wherein said clock generator comprises a phase locked loop (PLL) circuit.

8. The information processing unit according to claim 7, further comprising:
a system bus that connects devices configuring said information processing unit;
an arbiter that performs arbitration related to a use of said system bus; and
a clock control circuit that controls a clock to be supplied to said devices, said clock control circuit performing a bus request to said arbiter and performing a clock switch or clock halt after being granted the use of said system bus by the arbiter.

* * * * *